(12) United States Patent
Sussman

(10) Patent No.: US 7,118,027 B2
(45) Date of Patent: *Oct. 10, 2006

(54) METHOD AND SYSTEM TO ISSUE AN ELECTRONIC VISA OF A FOREIGN VISITOR AT A COUNTRY'S FOREIGN CONSULAR PREMISES

(76) Inventor: Lester Sussman, 9213 Bulls Run Pkwy., Bethesda, MD (US) 20817-2403

( * ) Notice: Subject to any disclaimer, the term of this patent is extended or adjusted under 35 U.S.C. 154(b) by 170 days.

This patent is subject to a terminal disclaimer.

(21) Appl. No.: 10/841,863

(22) Filed: May 10, 2004

(65) Prior Publication Data

US 2005/0167484 A1 Aug. 4, 2005

Related U.S. Application Data

(63) Continuation-in-part of application No. 10/771,008, filed on Feb. 4, 2004.

(51) Int. Cl.
G06F 17/00 (2006.01)
G06K 5/00 (2006.01)

(52) U.S. Cl. ........................... 235/375; 235/382
(58) Field of Classification Search ................ 235/375, 235/487, 492
See application file for complete search history.

(56) References Cited

U.S. PATENT DOCUMENTS 6,111,506 A * 8/2000 Yap et al. ................. 340/572.1

2004/0099731 A1* 5/2004 Olenick et al. .............. 235/380
2005/0180570 A1* 8/2005 Sussman ..................... 380/255

OTHER PUBLICATIONS

Ellen Groves, "To Make A Quick I.D., Play It By Ear", Apr. 12, 2004, p. 92, Businessweek, USA.
Panko, "Basic Error Rates", 1997, pp. 1-3, http://panko.cba.hawaii.edu/HumanErr/Basic.htm, USA.
USA Nonimmigrant Visa Application, DS-156, pp. 1-2, U.S. Dept. of State, Feb. 2003, USA.
Transaction Team 1500 Brochure, Oct. 2002, pp. 1-2, HHP, USA.
Issues & Elements of Credit Card Receipt & Signature Management, pp. 1-6, 17, ING@NICO, USA.

* cited by examiner

Primary Examiner—Daniel Stcyr

(57) ABSTRACT

This invention integrates with a country's customs and immigration system to issue an electronic visitor's visa, and to validate periodically, electronically a visitor's visa within the country's borders. A computer-encoded visa card is created and issued to the visitor at the country's overseas consulate. Pertinent visa application information is embedded in the issued card. Cryptographic technology is used with the card to maintain privacy, as well as to reduce fraud and other misuse. The card is used as the visitor's official identification document whilst in the country. During the visitor's stay, at specified intervals, the visitor registers with self-service kiosks, which are placed at various locations within the country. The kiosks are securely integrated with the customs and immigration database.

20 Claims, 4 Drawing Sheets

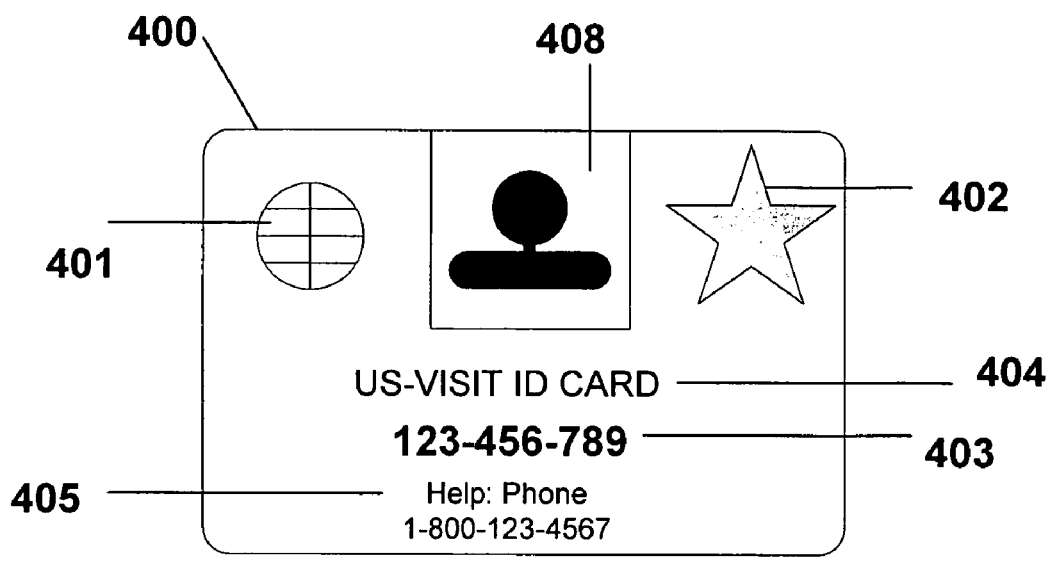
Fig. 3A                Card Front face
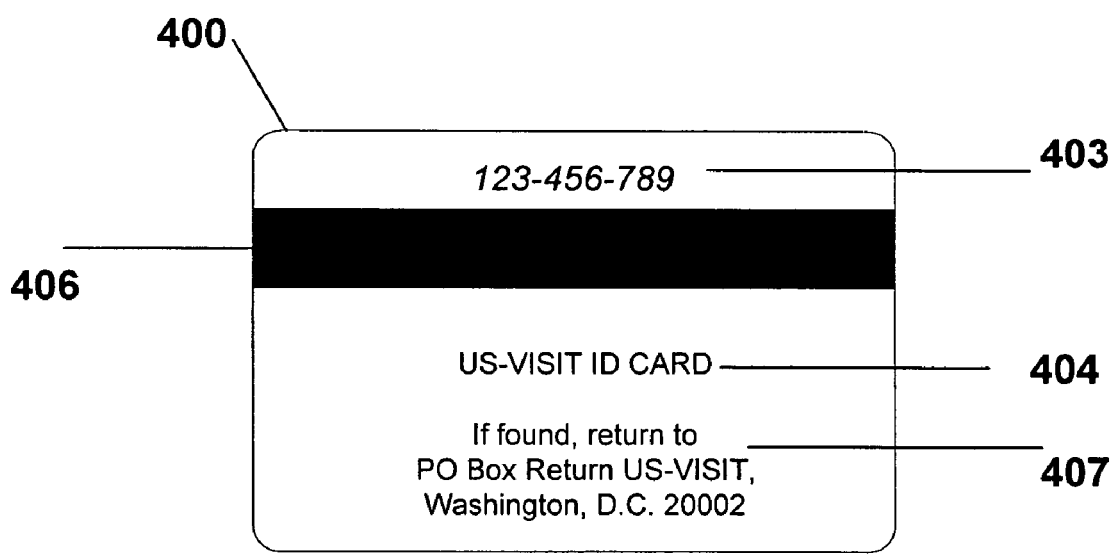
Fig. 3B                Card Rear face

METHOD AND SYSTEM TO ISSUE AN ELECTRONIC VISA OF A FOREIGN VISITOR AT A COUNTRY'S FOREIGN CONSULAR PREMISES

CROSS REFERENCE TO RELATED APPLICATIONS

This is a continuation-in-part of U.S. application Ser. No. 10/771,008, filed on Feb. 4, 2004.

TECHNICAL FIELD

This invention relates to computer service kiosks and computer encoded cards, specifically, this invention relates to a country's consulate's or embassy's service kiosk that is used to question and gather information from a person who is requesting a visa to enter and visit the said country. The issued visa is encapsulated in a smartcard.

BACKGROUND OF THE INVENTION

Since the tragedy of Sep. 11, 2001 (9/11), the US has been revising its methods and systems for issuing visas to foreign visitors. Newspapers have reported that a number of the 9/11 hijackers entered the US on fraudulent visas ("Some 9/11 Hijackers Got Into the U.S. With Fraudulent Visas", AP, Jan. 26, 2004). Furthermore, even prior to 9/11, theft and fraudulent use of passports were common. The US has tackled this problem in a number of ways, which are now briefly discussed.

After 9/11, the US Congress imposed a deadline of Oct. 26, 2004 for 27 industrialized countries to issue computer-coded passports for their citizens wishing to travel to the United States. This requirement is problematic in that the solution relies on other nations, rather than being under the control of the US. This invention addresses this issue in conjunction with the requirement of computer-coded travel documents.

In January 2004, the US Department of Homeland Security (DHS) implemented a new system at 115 airports and 14 seaports, which is designed to confirm the identity of arriving foreign visitors. The new system is called the US-VISIT program, i.e. the United States Visitor and Immigrant Status Indicator Technology. Further information on the US-VISIT program can be found at www.dhs.gov/interweb/assetlibrary/USVisitRegulation1-5-04.pdf Today the primary focus of US-VISIT is on entry. By the end of 2005, it is planned that entrance and exit procedures will be phased in at all border entrances in the US. Currently 30 airports implement the exit portion of the program.

The US-VISIT uses scanning equipment to collect biometric identifiers, specifically digital fingerprints and digital photos of a person's face.

Data collected from foreign visitors is securely stored as part of a visitor's travel record. Upon exiting the US, visitors check out at kiosks by scanning their passport or visa and repeating the fingerprint scan.

The stored information will be available to authorized officials and law enforcement agencies and will help verify compliance with visa and immigration policies. The information, e.g. the scanned fingerprints, will be checked against a database of known and suspected terrorists and other undesirables.

Two other existing US visitor systems are currently in place that use optical memory-based cards. The first system is the US Permanent Resident Card system. The second system is the Border Crossing Card system implemented by the Department of State. These systems do not use a computer kiosk to issue and verify the optical cards, as the present invention teaches.

A potential problem arises when a visitor overstays his visa. An article titled "Criminal aliens at large a 'crisis'" (The Washington Times, Feb. 11, 2004) highlights the problem and consequences of criminal visitors disappearing in the US, after deportation orders were initiated. The common global phenomenon of terrorist sleeper cells is another consequence of this problem.

In the current system, this overstay will be caught if he exits the country. It is possible that a warrant for visitor's arrest could be issued because the central database has detected a visitor's overstay. The problem is then locating the individual. The majority of visitor visas are issued for a period of six months. Within six months, it is possible for a visitor to fraudulently change his identity. The invention proposes to close many of these loop holes.

SUMMARY OF THE INVENTION

The invention integrates with a country's foreign visitor visa issuing system and process that is primarily the domain of the country's consular affairs. Visas are applied for and issued in foreign countries at various consulates and at the embassy of the issuing country.

The issuance of electronic visas includes:

The visa's applicant using a computer kiosk at the country's overseas consulate.

The computer kiosk gathers all pertinent data from the applicant in the applicant's language and translates the responses into standardized English for US authorities.

Data gathered includes the applicant's biometrics, such as a digital passport-type photo, fingerprints and other biometrics that may be required, e.g. a retina scan, etc.

The applicant's pertinent entered data is verified and checked against various Watch-lists, e.g. criminal and terrorist undesirables.

Storing an original copy of the visitor's immigration (or non-immigration) information in a central, secure database system—information, which is to be embedded in the visitor's issued computer encoded card (i.e. a visitor visa card), provided a visa is granted.

Once the applicant's data has been verified, an electronic visa is issued at the consulate in the form of a visitor visa card, in which pertinent immigration information is embedded.

Use of cryptographic technology with the visitor visa card is used to reduce fraud and other misuse.

The applicant is notified to collect her visitor visa card visa at the consulate.

Prior to boarding an aircraft, ship, etc., the visitor's visitor visa card visa is scanned by pertinent authorities to verify its integrity and association with the holder.

A self-service, automated kiosk/terminal, i.e. a Visitor-Visa Automated Teller Machine (ATM)/Kiosk with which the visitor interacts (i.e. checks in) at her issuing consulate/embassy, Port-of-Entry, Port-of-Exit, etc. The kiosk is also distributed at various locations within the country.

Secure integration of an ATM terminal/computer kiosk with the customs and immigration database.

The visitor's check-in periodicity depends upon visitor's visa type and length of stay in the country.

BRIEF DESCRIPTION OF THE DRAWINGS

FIG. 3A is a schematic of the front face of the invention's computer encoded visa card, i.e. the Visitor-Visa card.

FIG. 3B is a schematic of the rear face of the invention's computer encoded visa card, i.e. the Visitor-Visa card.

DETAILED DESCRIPTION OF THE INVENTION

Figure 1A:
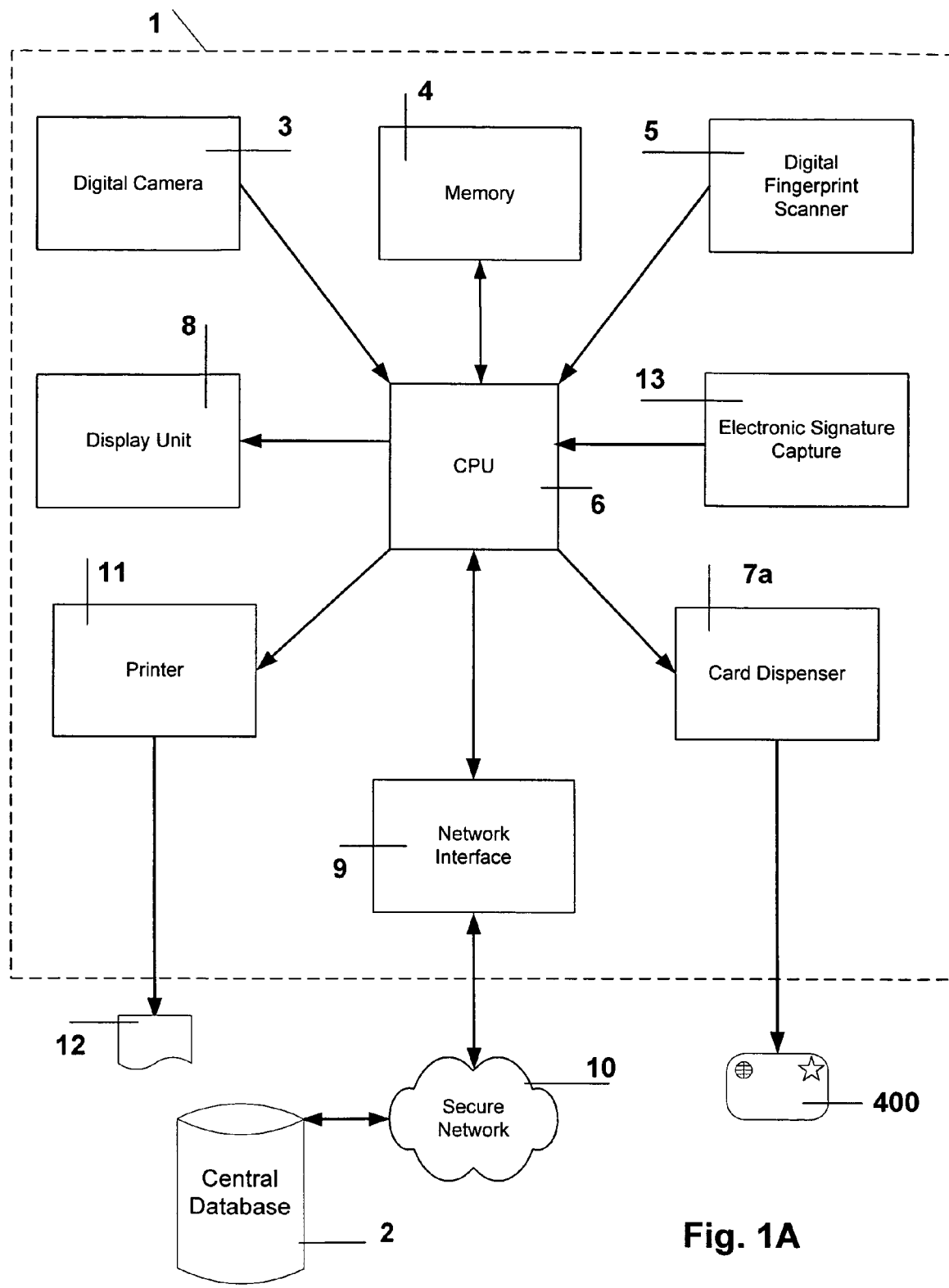
FIG. 1A is a block diagram of the various components of the present invention's embodiment of a Visitor-Visa Automated Teller Machine/Self-Service Kiosk which is located at various consulates around the world.

Below is a table of contents, listing the various major sections of the detailed description of the invention.
 1.0) Cryptography for Verification, Integrity and Confidentiality . . . 6
 2.0) Visitor-Visa Card . . . 8
 3.0) Visitor-Visa Automated Teller Machine (Kiosk) . . . 10
 4.0) Visitor-Visa Process . . . 14
 4.1) Initialization At Consulate—Block 19 in FIG. 2 . . . 14
 4.2) Verification at Port-of-Entry—Block 20 in FIG. 2 . . . 24
 4.3) Losing a Visitor-Visa Card . . . 28
 4.4) Time To Check-in—Block 21 in FIG. 2 . . . 29
 4.5) Check-in With Visitor-Visa Kiosk—Block 23 in FIG. 2 . . . 30
 4.5.1) Visitor-Visa Card Verification . . . 31
 4.6) Data Mining of the Central Database . . . 33
 4.7) Check Out At Port-of-Exit—Block 110 in FIG. 2 . . . 35

Before continuing to describe the invention in more detail, we first consider a quick overview of available cryptography.

1.0) Cryptography for Verification, Integrity and Confidentiality

Two key cryptographic technologies that the preferred embodiment of the invention uses are public key and conventional cryptography to ensure three things:
 (1.1) To verify the integrity of the Visitor-Visa Kiosk 1,
 (1.2) Confidentiality of the data transmitted between the Kiosk 1 and the Central Database 2 and
 (1.3) That the data has not been altered during either transmission between the Kiosk 1 and the Central Database 2, as well as not being altered whilst stored on the Visitor-Visa card 400.

Conventional cryptography is also called secret key or symmetric key cryptography. The Data Encryption Standard (DES), Triple Des and Message Digest 5 (MD 5) are examples of symmetric key cryptography.

Message digests are the representation of alphanumeric text in the form of a single string of digits, created using a one-way hash function. Encrypting a message digest with a private key creates a digital signature, which is an electronic means of authentication.

Use of secret keys to encrypt data is much faster than public key encryption, but the problem of using symmetric keys is the safe distribution of the keys between transaction partners, e.g. from a central office to remote offices where the Visitor-Visa Kiosk 1 is stationed. This key distribution is solved using public key cryptography.

Public key cryptography is an asymmetric method that uses a pair of keys for encryption: a public key that encrypts data and a private key (i.e. secret key) that decrypts the data. The public key is openly distributed. The key's owner keeps the private key secret. The secret key cannot readily be derived from the public key. Furthermore, if the key owner digitally signed the data using his private key, then the signature can be verified using the key owner's openly distributed public key.

The present invention uses cryptography to digitally sign the information stored on the Visitor-Visa card 400. Public key cryptography (i.e. Public Key Infrastructure or PKI) is used to communicate between a central office and the remotely located Kiosk 1 machines.

A Digital Certificate is an attachment to an electronic message used for security purposes. The most common use of a digital certificate is to verify that a user sending a message is who she claims to be, and to provide the receiver with the means to encode a reply. An individual wishing to send an encrypted message applies for a digital certificate from a Certificate Authority (CA). The CA issues an encrypted digital certificate containing the applicant's public key and a variety of other identification information. Note that in the preferred embodiment of the invention, the CA would most probably be an issuing authority within the government. The CA, in the preferred embodiment of the invention, makes its own public key readily available via distribution on a secure network. The recipient of an encrypted message uses the CA's public key to decode the digital certificate attached to the message, verifies it as issued by the CA and then obtains the sender's public key and identification information held within the certificate. With this information, the recipient can send an encrypted reply. The most widely used standard for digital certificates is X.509.

Various implementations of cryptography are used in the invention's preferred embodiment, such as Netscape's Secure Socket Layer (SSL), the IETF's OpenPGP, the Message Digest 5 (MD5), etc.

Note that because this invention would be used by the government, any cryptographic standards that the government uses would be implemented in the invention. In the US, the National Institute of Standards and Technology lists government standards for smartcards on a web site at smartcard.nist.gov. The Government Smart Card-Interoperability Specification is freely available from this web as the "NIST Interagency Report 6887-2003 edition Version 2.1".

The invention's embodiment relies on cryptography as described in further detail in the book titled "Applied Cryptography" (second edition), by Bruce Schneier.

We now consider the various hardware components of the invention before we discuss the process of the invention and its use of various components.

2.0) Visitor-Visa Card

The present invention includes the creation of an electronic visa card, which incorporates an identity card, i.e. the Visitor-Visa card 400 (see FIG. 3A and FIG. 3B).

FIG. 3A depicts the front view of the Visitor-Visa card 400. This card 400 becomes an ID card, as well as a computer-encoded visa for the visitor during the visitor's in-country stay. Furthermore, the card 400 can be used as an official identification document by airlines, hotels, banks, etc. The card 400 includes the following features:

(2.1) The card's physical format is similar to a credit card issued by various banks, etc. The primary reason for this is so that it can fit easily in a visitor's purse, wallet, etc. Furthermore, the person is more likely to securely store the card 400, whilst it's in his possession.

(2.2) A unique identification number 403 is embossed, or printed on the front of the card 400 (see FIG. 3A), as well as on the rear of the card (see FIG. 3B). This card identification number 403 is associated with the visitor's database 2 record. Technically, it is set up as an alternate database record key, i.e. the visitor's database record can be accessed directly by using this identifier 403.

(2.3) A card logo 402 is present on the front face of the card to provide easy identification of the card type, i.e. versus a person's credit card, etc. This logo can also be implemented as an anti-fraud measure, e.g. using a hologram picture, etc.

(2.4) Further card type identification information is provided on the card 400, namely specific card type text 404. In FIG. 3A, the example given is "US-VISIT CARD ID". This information is available on both sides of the card 400. This information can be embossed, or printed on the card 400. Other visual card type indicators include the representation of the issued visa type, i.e. US B1, B2, H1, H2, J1, J2, etc. This visual indicator can be, for example, by using color encoding of the card, or simply text printed on the card face 400.

(2.5) If the visitor requires assistance, e.g. locating a Visitor-Visa Kiosk 1 machine (more about this later) as depicted in the "Locate Visitor-Visa Kiosk in City", block 22 in FIG. 2, the visitor can call the number listed on the Help line 405, which is listed on the front of the card 400.

(2.6) A preferred embodiment of the invention includes a smart integrated circuit, i.e. a smart-chip 401 on the card 400. This smart-chip 401 is similar to the technology used in today's smartcards. An example of a smartcard is the ASECard Crypto from Athena. This smartcard provides Public Key Infrastructure (PKI) encryption technology to data stored on the card.

The invention uses the smart-chip 401 to store information about the visitor, using encryption technology to reduce the potential for fraudulent abuse of the card 400. The ASECard Crypto has up to 3 KB of non-volatile RAM to store information. As is common with integrated circuit technology, the size of memory will increase over time, and hence more data will be able to be stored in the smart-chip's memory.

Other electronic card technologies could as easily be used by the invention. An example of such a technology is the optical laser card, e.g. the Drexler Technology Corporation's Lasercard. The advantage to using an optical laser card is that it can hold a larger amount of data, e.g. two megabytes. Optical laser cards are used today in frequent US border crossings on the Mexican border. The security measures embedded in smartcards is preferable in the preferred embodiment of the invention, but the invention does not rule out the use of optical laser cards, or any other available, portable digital data storage technologies.

(2.7) The visitor's photo 408 is printed directly onto the front face of the card 400.

(2.8) Use of the smart-chip 401 on the card 400 could be replaced by using a magnetic stripe 406, for example, on the rear face of the card (see FIG. 3B), as is used by today's credit cards, etc. Standard technology on today's magnetic stripe cards has three tracks on which data can be encoded. The first track allows seventy-nine (79) alphanumeric characters to be encoded, the second track allows forty (40) numeric characters to be encoded, and the third track allows one hundred and seven (107) numeric characters to be encoded. As can be seen, the smart-chip 401 allows more data storage on the card 400 than a magnetic strip 406. Note that in the use of an optical laser card, pertinent memory is used.

(2.9) The rear face of the card 400 (see FIG. 3B) also includes information 407 that can be used to return the card 400 if it is lost by a visitor and found by another person.

3.0) Visitor-Visa Automated Teller Machine (Kiosk)

Figure 1B:
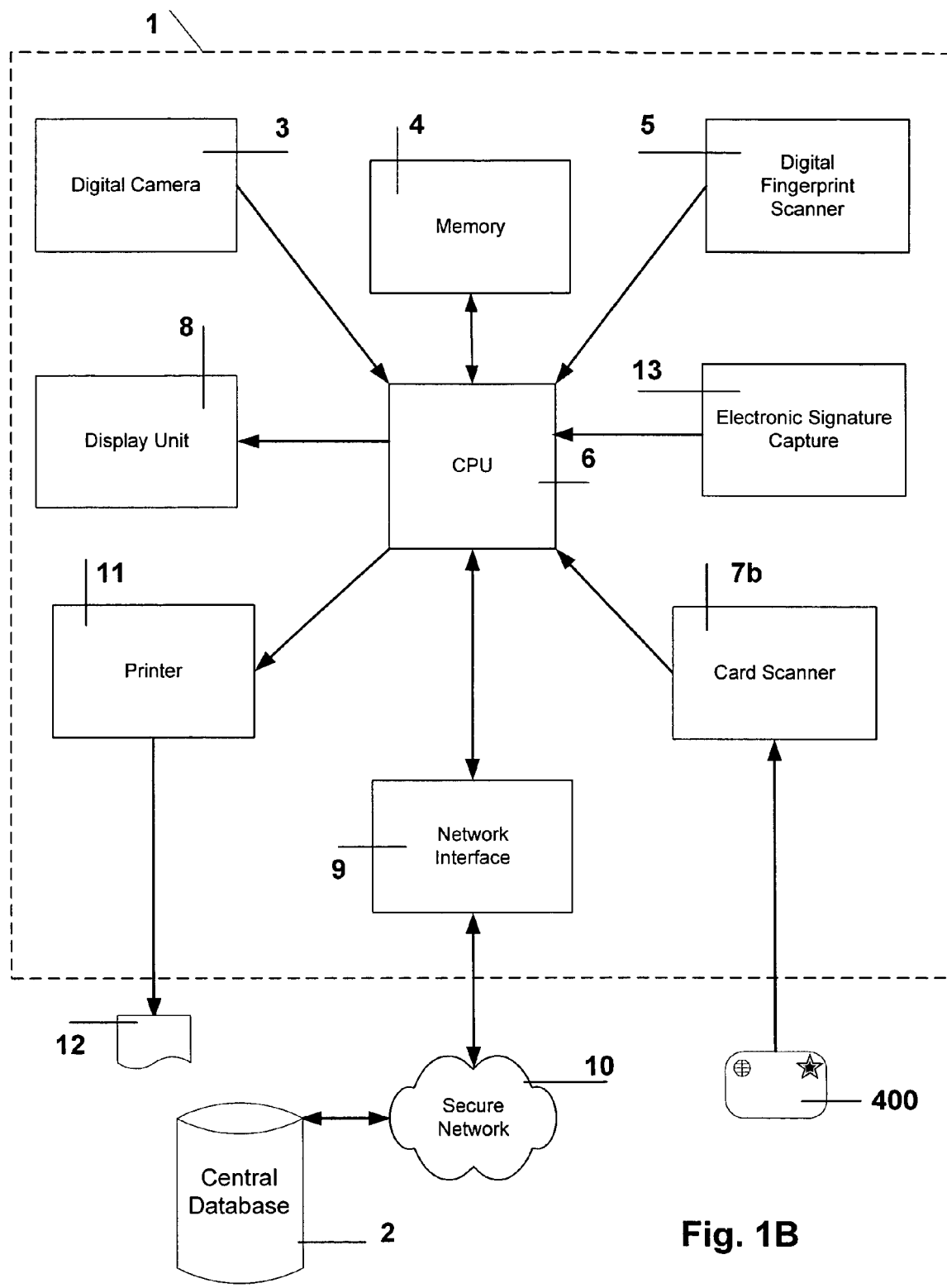
FIG. 1B is a block diagram of the various components of the present invention's embodiment of a Visitor-Visa Automated Teller Machine/Self-Service Kiosk which is located at various locations in-country, including Port-of-Entry and Port-of-Exit.

FIG. 1A and FIG. 1B depict block diagrams of the various components of the invention's Visitor-Visa Kiosk 1. The difference between FIG. 1A and FIG. 1B is that FIG. 1A is used in the various consulates, and other officially authorized visa issuing stations, to issue a Visitor-Visa card 400, whereas FIG. 1B represents the Kiosks used in-country to verify the visitor's visa status, at Port-of-Entry, Port-of-Exit and at various other locations throughout the visited country.

The primary difference is the fact that the embassy/consulate's Kiosk in FIG. 1A requires a Visitor-Visa card dispenser 7a, whereas the Kiosk in FIG. 1B simply requires a Visitor-Visa card scanner (reader) 7b. It is obviously possible to have the Kiosk in FIG. 1B having the means to generate a smartcard as well. For descriptive purposes, this distinction is kept in the description of the invention.

The Visitor-Visa Kiosk 1 is similar, for example to the various ATMs that banks provide their customers. The invention's Visitor-Visa Kiosk 1, includes the following components:

(3.1) A digital camera 3 that is used to verify the identity of the person using the Kiosk machine 1. The resolution (i.e. dpi) of this camera 3 is similar to the resolution of the digital camera used to photograph the visitor at the originating consulate. This is important in order to compare the original digital image with the Kiosk 1 captured digital image.

(3.2) Memory 4 to store both programs that control the Kiosk 1, as well as memory to process data received via the various interfaces of the Visitor-Visa Kiosk 1.

(3.3) A digital fingerprint scanner (i.e. reader) 5 that is used to scan in (i.e. read) the fingerprint to verify the identity of the person using the Kiosk 1. The resolution (i.e. dpi) of this fingerprint scanner 5 is similar to the resolution of the digital fingerprint scanner used to scan the visitor at the originating consulate/embassy. This is important in order to compare the original digital image with the Kiosk 1 captured digital image. Note that if other forms of biometrics (e.g. retina scans, DNA sampling, ear-photo ["To Make a Quick I.D., Play It By Ear", Business Week, p.92, Apr. 12, 2004], etc.) were used, then the relevant biometric scanner would be incorporated into the Kiosk 1.

(3.4) A processing unit, i.e. a CPU 6 and associated circuitry that controls all the various electronic components of the Visitor-Visa Kiosk 1. Note that the Visitor-Visa Kiosk 1 could simply be implemented as a standard computer, e.g. a MS-Windows, or Linux PC, or any other available computer system. NCR's Easy-Point™ 41 self-service kiosk runs under various Microsoft operating systems, including Windows® NT and XP.

(3.5) A card dispenser 7a in FIG. 1A is present in the Kiosks at the various consulates, or other official visa issuing stations. This component is used to issue the Visitor-Visa card 400 to a valid visa applicant. The card dispenser 7a component includes a physically secure safe that holds the computer encoded cards for issue, i.e. similar to a bank's ATM's cash dispenser. Physical security of non-issued computer encoded cards is critical to defending against potential fraudulent abuse.

For Kiosks that are located in-country, a card scanner (i.e. reader) 7b is part of the Kiosk rather than the dispenser 7a. The card scanner 7b scans (i.e. reads) the Visitor-Visa card 400 that was initialized during the "Initialization At Consulate" 19 process. The card scanner 7b is able to read information stored in either the card's magnetic stripe 406, and/or the card's smart-chip 401. If an optical lasercard, or any other data storage technology is used, then the card scanner 7b would be able to read the data stored in the card's memory.

(3.6) A display unit 8 (e.g. a computer screen) on which to display messages for the visitor. The preferred embodiment of the invention uses a touch-screen display. The display 8 is also used to display an interactive keyboard if information is required to be entered by the visitor. The display of a multitude of language alphabets is relatively easy using such a touch-screen keyboard.

Note that a physically, separately installed keyboard could be part of the Kiosk 1, but for a number of reasons this option is not used in the invention. Two reasons opposed to using a physical, mechanical keyboard include (a) it would be very difficult to accommodate the various alphabets of the multitude of global languages on a, e.g. PS/2 keyboard and (b) a physical keyboard would increase the maintenance and potential mechanical problems arising from such a device.

One other note at this point is that the present invention does not exclude the use of computerized audio, person-computer interaction (i.e. computer voice recognition technology), rather than a visual menu system on the display 8 with the visa applicant via the Kiosk 1.

(3.7) A network interface 9 is provided so that the Visitor-Visa Kiosk 1 can interact over a secure network 10 with the Central Database 2, as well as other needed computer and communications systems. The secure network 10 can be implemented as a private network (e.g. via X.25, dedicated telecommunication lines, satellite VSAT network, a wireless network, etc.), a virtual private network over the Internet, etc.

(3.8) A printer 11 is available to print any messages, directions, and other information on a piece of paper 12 for the visitor to take away with her.

(3.9) A signature capture terminal 13 is used to input an applicant's signature that is required on all relevant documents. For example, on the U.S. Department of State form DS-156, the Nonimmigrant Visa Application form, an applicant's signature is required. An example of a signature capture terminal is the Transaction Team™ 1500 from HHP.

These signature capture terminals are common in today's point of sales credit card transactions. Today signatures captured in this manner are commonly accepted. Furthermore, the legality of such signatures is clearly defined in the Uniform Commercial Code Section 1-201(39).

Other components not shown in FIG. 1A and FIG. 1B include a visible marker (e.g. markers in the shape of footprints) on the ground, or elsewhere, on which the visitor is to stand, etc. in order to be within the focal length of the digital camera 3. Although not used in the preferred embodiment, it is possible to include a component in the Visitor-Visa Kiosk 1 that can electronically measure the height and/or weight of the visitor and to process the information accordingly.

Each Visitor-Visa Kiosk, i.e. in FIG. 1A and in FIG. 1B has a unique Digital Certificate embedded in its memory 4 (not depicted in FIG. 1). This certificate is used to uniquely identify the Kiosk 1, used in secure communications with the Central Database 2 (e.g. via SSL), as well as being used to encode any information for transmission. The digital certificate is used similarly as a digital certificate is used in electronic commerce (e-commerce) on the Internet today. Note that the present invention does not exclude other means for uniquely identifying the Kiosk 1, e.g. using a computer MAC address, etc.

Furthermore, the public-key that was used to issue the Visitor-Visa card 400 at the consulate is stored in memory 4 as well for in-country Kiosks (i.e. as in FIG. 1B). This public-key (or set of public keys from various consulates, each with their own unique public key) is used to verify the digital signature stored on the Visitor-Visa card 400.

4.0) Visitor-Visa Process

We now consider the visitor visa card process and system in more detail. The visa process starts with the "Initialization At Consulate", block 19 in FIG. 2.

Figure 2:
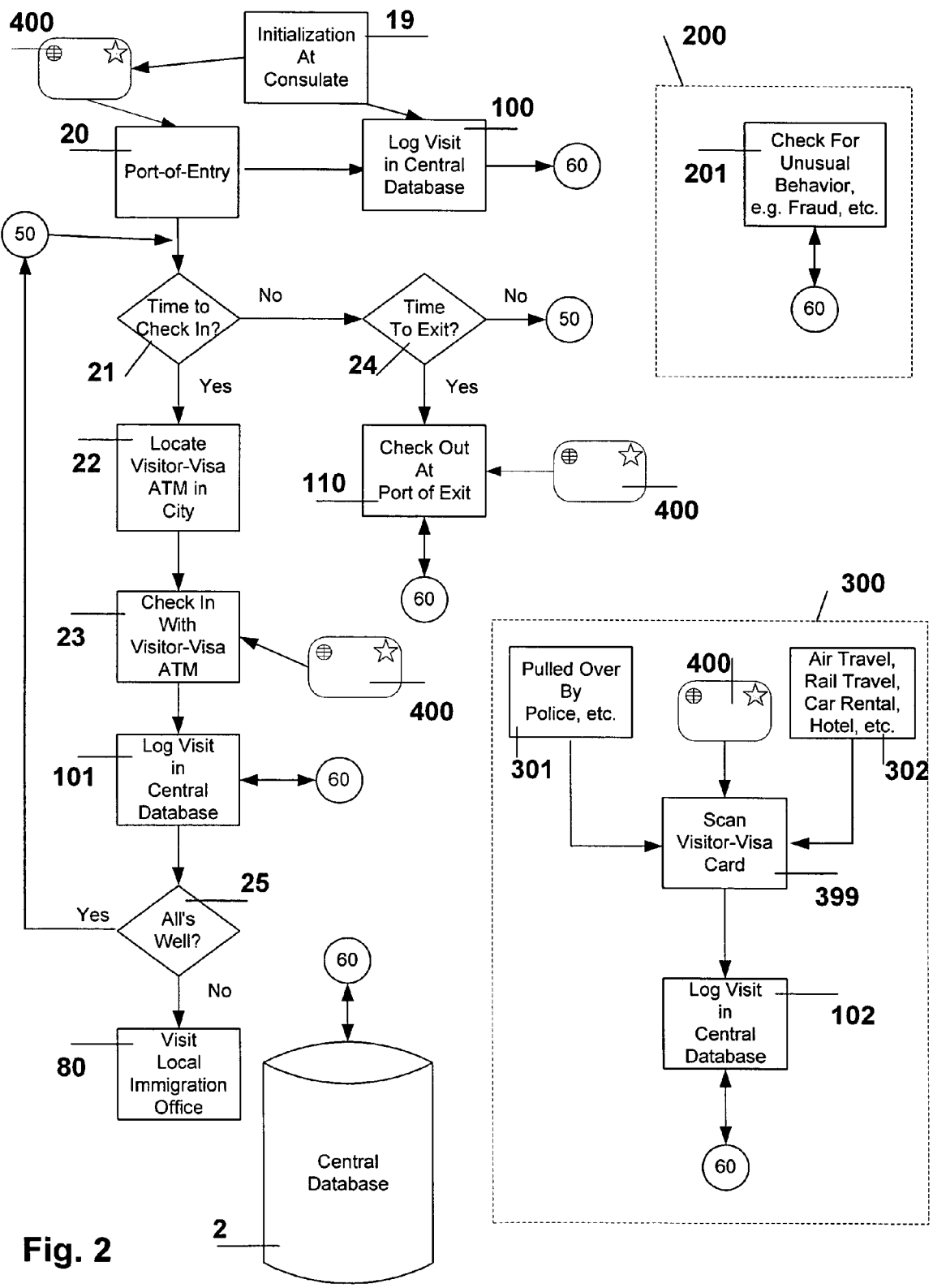
FIG. 2 is a flow chart of the various processes embodied by the present invention.

4.1) Initialization At Consulate—Block 19 in FIG. 2

This initial step (i.e. visitor registration) in the process includes the digital photographing and fingerprinting, or other biometric information gathering of the visitor. The information is gathered at the consulate in the visitor's country of origin, using a computer Kiosk 1 (see FIG. 1A). This information is stored 100 by each Kiosk 1 in a Central Database 2, which is remotely located from each of the Kiosks. The Central Database 2 is securely networked to each of the Kiosks. The Central Database 2 is controlled by a server computer (not shown in diagrams), and a variety of software running on the server.

Note that because of the dispersed location of the issuing Kiosks around the globe at various consulates, it may be necessary to initially store the applicants' data locally within the consulate before transmitting it to the Central Database 2, i.e. store-and-forward computer technology processing. This process is not depicted in the diagrams.

The visa applicant is shown an available Kiosk 1 by a consulate staff. The Kiosk 1 has markings (not illustrated in FIG. 1A nor FIG. 1B) as to where the person needs to stand, or be seated depending on the ergonomics of the Kiosk 1, in order to appear correctly within the focal length of the Visitor-Visa Kiosk's digital camera 3. The consulate staff initially assists the applicant in the use of the Kiosk 1, as well as initially selecting the applicant's language of choice, in which all the displayed information on the kiosk's screen 8 (display unit) will be communicated. It is also the language in which the alphabet on the kiosk's touch-screen keyboard is displayed. This language preference is stored in the Kiosk's Memory 4 as part of the visa applicant's record.

The CPU 6 retrieves the relevant language menus that are pre-stored in the Kiosk's memory 4. The reason for this is obvious, i.e. to minimize any potential communications problems with the visitor regarding any conveyed instructions, etc. Note that it is possible for the invention to simply store in memory 4, say the English menu system, and then to programmatically translate to the visitor's preferred language. The preferred embodiment of the invention uses the simpler method of pre-storing menus in all of the accepted foreign languages. This reduces the need and expense for today's relatively sophisticated language translation software to be embedded in the Kiosk 1.

The first thing that the Kiosk 1 does is to collect the applicant's biometric data, e.g. via the kiosk's Digital Camera 3 and Digital Fingerprint Scanner 5. All information gathered from the visa applicant is temporarily stored in the kiosk's Memory 4 as part of the applicant's record. The first message to appear on the Kiosk's display 8 is for the visitor to remove any headgear, sunglasses, etc. that could interfere with the facial identification of the person. Next, the person is informed that a photo will be taken. Preferably, a countdown indicator is displayed on the display 8 informing the visitor of the imminent photo taking.

After the digital photo has been taken, the visitor is prompted via the Kiosk's display 8 to place his pertinent finger on the surface of the digital fingerprint scanner 5. His fingerprint is digitally scanned in and temporarily stored in memory 4. Other biometric information is collected at this stage, provided, that such biometrics are part of the personal validation process.

The date and time of the transaction, as well as the identification number of the Visitor-Visa Kiosk 1 is recorded in Memory 4 as part of the applicant's record. Amongst the various reasons for this step is for auditing purposes.

The visa applicant is then prompted on the display unit 8 to enter all pertinent data for his visa application. Any data that are deemed imperative is a required field on the data entry system of the Kiosk 1. If the applicant refuses, or cannot enter the required data, a number of actions take place. Firstly, the applicant is prompted whether they need personal assistance. If this is in the affirmative, then the consulate personnel are notified that assistance is required by the applicant at a specific Kiosk 1. On the other hand, if the applicant does not have the required data in-hand, then they can elect to suspend the visa application process and return at a later date. Another option is simply for the applicant to abandon the visa application and walk out of the consulate. In the latter two options, the applicant's record in Memory 4 is tagged with a pertinent reason code and the kiosk session is terminated. At no point is the applicant allowed to continue with the visa application unless the current required field is satisfied. This simple, commonly available computer data entry technique of using required fields, reduces the possibility of an incomplete visa being issued to an applicant.

If during a visa application, the applicant needs to submit additional paperwork, then the Kiosk 1 would communicate this requirement. The paperwork could be submitted in a number of ways, for example:

(a) The Kiosk 1 could have a facility for the applicant to submit the paperwork to in a supplied envelope, which is appropriately labeled/tagged for tracking purposes.

(b) Alternatively, a consulate staff member is called by the Kiosk 1 and collects the pertinent paperwork from the applicant.

The applicant's record in memory 4 is accordingly updated, e.g. with the ID number of the consulate staff who collected the paperwork, or with the supplied envelope's tag identifier.

Once the visitor has submitted all of his required information, the visitor's temporary data record stored in the Kiosk's memory 4, is sent to the Central Database 2, via a secure network 10. In FIG. 2, this step in the process is identified as "Log Visit in Central Database", block 101.

Depending upon the speed that the system can process the verification of the applicant's data, the applicant may have to be notified to return later whilst her application is being processed. On the other hand, if the system is highly responsive, then the visa applicant could wait at the consulate whilst her application is being processed.

A program at the Central Database 2 then processes the received visa applicant's information. A key part of the processing is a check against criminal, terrorist and other undesirable watch-list databases. These databases could include those of Interpol, intelligence agencies, national and local law enforcement, etc. It is also possible for the watch-lists in the applicant's country to be checked. This would assist countries in curbing criminals escaping being brought to justice.

The next step in the visa application process is similar to the later check-in process, which is depicted in block 25 in FIG. 2, i.e. the "All's Well?" symbol. The following scenarios are possible:

(4.1.a) If a problem is encountered, e.g., the visitor's biometric, or other identification data is found in a watch-list database, then a pertinent anomaly message is returned to the consulate, which the applicant visited in applying for the visa. The consulate staff would then take appropriate action, e.g. direct the applicant to a personal interview with a skilled consulate staff member. The applicant's record in the Central Database 2 is tagged accordingly, as well as with any other pertinent data, such as the consulate's identifier, etc.

Another problem that could be encountered could be that the applicant's data is unsatisfactory, e.g. insufficient funds may be available for the visitor's planned stay in the US., etc. In this case, a message is communicated to the consulate. Once again, the visitor's Central Database 2 record is tagged as problematic, with the appropriate code, as well as any other pertinent data. The consulate would then contact the applicant to correct the problem.

(4.1.b) On the other hand, it is possible that authorities have tagged the visitor's pre-existing Central Database 2 record as "need to apprehend". In this case, a message is communicated to the consulate, and/or if a trusted relationship exists between the US and the originating country, then the country's law enforcement could be notified as well. Once again, the visitor's Central Database 2 record is tagged as problematic, with the appropriate code, as well as any other pertinent data.

(4.1.c) For most visitors, no problems would be encountered. The Central Database 2 visa application program sends a message to the consulate to issue the applicant's visa, i.e. in the form of a Visitor-Visa Card 400.

Other possible "All's Well?" scenarios could exist, and even though they are not described here, they are not excluded from the present invention.

Even though the preferred embodiment of the invention does not specify the following process, it nevertheless could be incorporated into the system. This process relates to the pre-application part of the visa application. Today an applicant must report to the nearest embassy or consulate to apply for a visa. The wait in line is generally very long. Even though the use of multiple kiosks will speed up the process, data entry prior to using a Kiosk 1 is briefly discussed. It is possible to allow the visa applicant to apply via the Internet. This step would allow the applicant to enter pertinent data, say via a web site on the internet, preferably via secure connection (e.g. using SSL). The applicant would then be given a confirmation number, which she would then use when applying at the consulate's Kiosk 1. The applicant still needs to apply at a Kiosk 1 at an embassy or consulate. The reason is primarily to gather biometric data from the applicant, which for obvious reasons, is preferably done at the consulate or embassy. The confirmation number that was given to the applicant via the online web site is then entered when continuing the process at a Kiosk 1. A great amount of time would be saved by having most of the visa application's data already entered into the system.

We now consider the case in which the applicant's visa has been granted. The purpose of the Visitor-Visa Card 400 is similar to the use of a state driver's license in the US, i.e. a means of personal identification. Today the visitor primarily has his passport as a means of identification when visiting a foreign country.

In the preferred embodiment of the invention, the visitor's photo 408 is directly printed onto the front face of the card 400. This makes the card 400 representative of a foreign visitor's in-country id document. Note that it is possible to embed the visitor's date of entry (see Table 1, item [2]) in the photo. This feature would help simplify the visual validation of the visitor's authorized stay in the country.

Table 1 illustrates the type of data stored on this card 400, when using the smart-chip 401, or other technology that can store a large amount of data, such as a lasercard. This information is also stored (see "Log Visit in Central Database", block 100 in FIG. 2, via the on-page connector "60") in the Central Database 2.

TABLE 1

| Visitor's Information | Description |
| --- | --- |
| 1) Last Name, Middle Initial[s], First Name | Visitor's full name. |
| 2) Date of Entry | Date (e.g., MM/DD/YY) on which the card was created and issued at the overseas consulate. |
| 3) Visitor-Visa Card Number | This unique identification number 403 is embossed on the front of the card 400, as well as on the rear of the card (see FIG. 3B). This card identification number 403 is associated with the visitor's database 2 record. This number is also stored on the card's smart-chip 401 memory and/or magnetic stripe 406. |
| 4) Length of Stay | Authorized length of stay in country. For example, a B2 visa could have a six-month stay. |
| 5) Visa Type | Visa classification, e.g. B2, H1-B, J1, M1, etc. This data could be encrypted to be used only by authorized personnel. |
| 6) Digital Photo | Copy of digital photo. |
| 7) Height | Self-explanatory. |

TABLE 1-continued

| Visitor's Information | Description |
| --- | --- |
| 8) Color of Eyes | Self-explanatory. |
| 9) Color of Hair | Self-explanatory. |
| 10) Language(s) | Visitor's language of preference, as well as others that the visitor understands. This language will be used on the display unit 8 of the Kiosk 1 when the visitor interacts. |
| 11) Other Data | Other data needed for the visa checking process, e.g. issuing consulate code, Country of Origin, Residential Address, Residential Phone Number, visitor's weight, Passport #, Occupation, Signature, etc. |
| 12) Digital Fingerprint (encrypted) | Copy of scanned digital fingerprint. Encrypted to be used only by authorized personnel. |
| 13) Digital Signature | Digital signature of the above information (e.g., [1] to [11]) to prevent fraudulent change of information. |

Other information could also have been gathered at the time of the visa application, e.g. the person's weight could be entered by having the visitor unobtrusively be standing on a weight scale when being fingerprinted, etc. This information would be stored in the Central Database 2, i.e. in Table 1, "Other Data". Other data that can be captured includes any data that is needed on the various immigrant (e.g. US forms I-140, I-485, etc.) and nonimmigrant (e.g. US forms DS-156, I-129, etc.) application forms.

Referring to Table 1, some of the information is encrypted to prevent unauthorized viewing of the specific information. The invention does not prevent the encrypting of other, or all of the information. The primary purpose of the card 400 is for use of the identification of the visitor, as well as ensuring that the visitor does not overstay his visit in the country.

One example of data that would be encrypted for privacy, would be data that is voluntarily entered about the applicant's health. For example, the applicant could include data about her health, for example, she suffers from diabetes, high blood pressure, allergies (e.g. to specific medications, etc.), medications that the applicant needs, etc. This data would be encrypted using a public key that the relevant authorities would be able to decrypt and extract from the card 400, e.g. Emergency Medical Teams, hospitals, etc.

In the case where the smart-chip 401 is not used, e.g. because of implementation costs, etc., then the magnetic stripe 406 would be used. Unfortunately, today the magnetic strip 406 cannot store all of the information as described in Table 1 (see section "1] Visitor-Visa Card", sub-section [1.7]). In this case, only the Visitor-Visa Card Number (Table 1, item [3]) and the Digital Signature (Table 1, item [12]) is stored in the magnetic stripe 406. Note that the Digital Signature is created at the consulate, or other official visa issuing station, based on all of the pertinent information depicted in Table 1, which could be stored in a smart-chip 401, if one was used. Later for validation purposes, the Digital Signature is centrally validated against the original data.

The actual location of where the card's data is gathered, encrypted and digitally signed needs further explanation. Bearing in mind that PKI cryptography is used in the preferred embodiment of the invention, this means that careful consideration needs to be given to the availability of the visa issuing authorities private key.

The private key is used to encrypt data, as well as to create the above-mentioned Digital Signature (see Table 1, item [13]). We now consider the following possible implementations (where encryption implies both data encryption, as well as creating the data's digital signature) at the consulate—listed by decreasing risk of potential abuse:

4.1.1) Encryption at each Kiosk 1 located in the consulate. This would require a copy of the private key to be distributed to every Kiosk 1 in the consulate. The risk for misuse is highest in this scenario. Each Kiosk 1 would have to be sufficiently powerful enough to handle the encryption process in a relatively short period.

4.1.2) Encryption at a central computer server located in each consulate, which serves the multiple Kiosks in the consulate (see [4.1.1] above). This would require a copy of the private key to be distributed to every central computer server located in each consulate. The risk for misuse is relatively high in this scenario, but much lower than in case [4.1.1] above. The misuse risk can be mitigated by strict control of access to the consulate's central computer server. Furthermore, the consulate's central computer server processing power would have to be much larger than the above-mentioned scenario, because of the aggregation of processing for multiple kiosks at the consulate. Each Kiosk 1 would have to be securely networked to the consulate's central computer server.

4.1.3) Encryption at a central computer server located in each region, i.e. country of the consulate service, which serves multiple consulates (see [4.1.2] above). The obvious location of such a computer would be at the country's embassy. This would require a copy of the private key to be distributed to every central computer server located in each service region, i.e. country/embassy. The risk for misuse is much lower in this scenario, than in both of the above cases (see [4.1.1] and [4.1.2] above). The misuse risk can be mitigated further by strict control of access to the embassy's central computer server. The problem in this scenario is that the card 400 data (i.e. Table 1) would have to be sent to the embassy's central computer server for encryption, etc. This would require a highly available and secure communications network between the various consulates and the embassy's central computer server. The embassy's central computer server processing power would have to be much larger than the above mentioned scenarios, because of the aggregation of processing for multiple consulates.

4.1.4) Encryption at a central computer server located in a single location of a country's consular affairs, which serves multiple countries (see [4.1.3] above). For example, this computer could be located within the embassies'home country borders, e.g. for US embassies, the server could be located in a Washington, D.C. facility. This would require a single copy of the private key to be distributed on the single central computer server. The risk for misuse is lowest in this scenario, compared to all of the above cases. The misuse risk can be mitigated further by strict control of access to the single central computer server. The problem in this scenario is that the card 400 data (i.e. Table 1) would have to be sent to the single central computer server for encryption, etc. from all of the Kiosks, from all over the world. This would require a highly available; secure communications network, and relatively large bandwidth, between the various consulates around the world and the single central computer server. Furthermore, the central computer server's processing power would have to be much larger than all of the above mentioned scenarios, because of the aggregation of processing for all consulates. The single central computer server could be a supercomputer, a mainframe computer, or a cluster of mainframe computers, or a cluster of mid-size computers, etc.

Note that the problem of a reliable and secure network could be overcome by using process and technology. One process solution would be to collect all of the applicant visa data from the multitude of consulates around a specific country, and then have them sent to a central location, e.g. the country's embassy, for transmission to the central computer. Alternatively, technology such as VSAT satellite networking could be used to connect the various consulates to the embassy.

The preferred embodiment implements option [4.1.3] above, i.e. encryption at a central computer server located in each country (i.e. embassy, which serves multiple consulates within a country). The card 400 data is transferred to the country's central computer server, pertinently encrypted and digitally signed (i.e. created in "cryptographic state"), and then the data are returned in the cryptographic state to the consulate's computer server in order for a card 400 to be created and issued by one of the consulate's Kiosks.

As soon as the applicant's encrypted visa data is available at the consulate, i.e. the applicant's visa has been granted, the applicant is contacted by mail, telephone, etc. to stop by the consulate and pick up his Visitor-Visa card 400, if this visa verification process cannot be implemented in a relatively short period, i.e. within a few hours.

The Visitor-Visa applicant personally comes to the consulate to collect the card 400. To collect the card 400, the applicant again uses the Kiosk 1 in the consulate. This time, the applicant has his biometrics re-entered into the system and any other data such as his name, etc. The Kiosk's card dispenser 7a then populates a card 400 with the approved visa applicant's data. Once the card 400 has been created, it is ejected from the Kiosk 1 and taken in hand by the applicant. The applicant's database record in the Central Database 2 is updated that a card 400 has been issued. The Visitor-Visa card's unique identification number 403, date and time of issue, place of issue, etc. is included in the update transaction sent to the Central Database 2.

Note that the applicant could also collect the card 400 from a staff member of the consulate, but for auditing purposes, the preferred embodiment of the invention has the Kiosk 1 issuing the card 400 to the applicant.

Once the Visitor-Visa Card 400 is ejected from the Kiosk 1, the applicant can now travel to the US. If prior to traveling to the US, the visitor loses his card 400, then he needs to contact the consulate to initiate the "Losing a Visitor-Visa Card" process (similar to the process described in section 4.3 below titled "Losing a Visitor-Visa Card").

An explanation is given to the visitor, e.g. via a pamphlet, regarding the use and relevance of the card 400. The US visitor now simply takes his Visitor-Visa card 400 with him, along with his passport, when he travels to the USA.

Note that the Visitor-Visa card 400 can be used by transport carriers, e.g. airlines, as verification of the traveler prior to boarding the carrier. The various verification methods described in section "4.5) Check-In With Visitor-Visa Kiosk" (Block 23 in FIG. 2) can be fully, or partially incorporated by the transportation carriers. One of the key goals of the present invention is to prevent the unauthorized travel of a US bound visitor, at the earliest point in time and location.

4.2) Verification at Port-of-Entry—Block 20 in FIG. 2

On entering the US, the visitor proceeds through the customs and immigration process. This process, as embodied in the present invention, builds upon the currently implemented US-VISIT system.

The addition includes a form of the Kiosk 1, specifically as depicted in FIG. 1B. This kiosk is preferably placed at each immigration official's workstation. Consequently, the physical footprint of this Kiosk would most likely be different from the Kiosks used at the consulates. The key reason for this difference is the physical space limitations at each immigration official's workstation.

The Kiosk 1 has markings (not illustrated in FIG. 1A nor FIG. 1B) as to where the person needs to stand in order to appear correctly within the focal length of the Visitor-Visa Kiosk's digital camera 3.

The visitor enters her card 400 into the Kiosk's card scanner 7.

A quick note about data entry errors. There have been numerous studies on the error rates of people typing in computer data. In an online paper by Panko (http://panko.cba.hawaii.edu/HumanErr/Basic.htm) various human error rates under various contexts are summarized. In one study by Grudin (1983), the error rate per keystroke of professional typists was 1% per keystroke. The Panko paper lists other data entry rates as well. Consequently, it can be seen that the current invention's use of minimizing data entry is advantageous.

The data retrieved from the visitor's card 400 is temporarily stored in the Kiosk's memory 4 for processing purposes, as well as along with the date and time of the transaction, as well as the geographic location of the Visitor-Visa Kiosk 1. Note that the geographic location of the Visitor-Visa Kiosk 1 could simply be implemented as a device id, which the Central Database 2 then translates into the known geographic location. Pertinent scanned card 400 information is displayed on the immigration official's workstation computer screen. This eliminates any possible data entry errors that the official may introduce if the immigration official had to type in the visitor's information.

The Kiosk's CPU 6 next verifies that the visitor's card 400 has a valid digital signature (see Table 1, item [13]). If the digital signature is invalid, then the CPU 6 notes this information as part of the temporarily stored data record of the visitor in memory 4. The reason for this is that further validation of the person's identity is required, i.e. via biometrics such as a digital fingerprint scan and a digital photo. All anomalies and the status of the various checks are displayed on the immigration official's workstation computer screen.

Note that at no time does the invention forewarn the visitor of any problems. The reason for this is not to alarm the visitor before more data is gathered and/or the relevant authorities are notified and have had time to act, etc.

The Kiosk 1 retrieves the language (See Table 1, item [10]) in which the visitor prefers to communicate. The CPU 6 retrieves the relevant language menus that are pre-stored in the Kiosk's memory 4. The reason for this is obvious, i.e. to minimize any potential communications problems with the visitor regarding any conveyed instructions, etc. Note that it is possible for the invention to simply store in memory 4, say the English menu system, and then to programmatically translate to the visitor's preferred language. The preferred embodiment of the invention uses the simpler method of pre-storing menus in all of the accepted foreign languages. This reduces the need and expense for today's relatively sophisticated language translation software to be embedded in the Kiosk 1.

The first message to appear on the Kiosk's display 8 is for the visitor to remove any headgear, sunglasses, etc. that could interfere with the facial identification of the person. Next, the person is informed that a photo will be taken. Preferably, a countdown indicator is displayed on the display 8 informing the visitor of the imminent photo taking.

After the digital photo has been taken, the visitor is prompted via the Kiosk's display 8 to place his pertinent finger on the surface of the digital fingerprint scanner 5. His fingerprint is digitally scanned in and temporarily stored in memory 4. If other biometrics are used in the personal identification of the visitor, then the relevant data are gathered at this stage.

For the casual visitor to the country, this would suffice for the Kiosk check-in process. On the other hand, if the visitor is say a student, then other information could be asked to be verified by the visitor, for example, the visitor's current residential address, place of study, etc. (i.e. in "Other Data", Table 1). If any information has changed, a touch-screen keyboard is displayed on the display 8, and the visitor is prompted to enter the correct information. Other examples of longer-term foreign visitors are temporary workers, visiting academics, political refugees, etc.

Once the visitor has submitted all of his required information, the visitor's temporary data record stored in the Kiosk's memory 4, is sent to the Central Database 2, via a secure network 10. In FIG. 2, this step in the process is identified as "Log Visit in Central Database", block 101.

A program at the Central Database 2 then processes the received information by comparing all the pertinent data (see Table 1) with a copy of the visitor's identification data (i.e. in Table 1), which was originally stored in the Central Database 2 at the time that the visitor's card 400 was created and issued.

The next step in the check-in process is depicted in block 25 in FIG. 2, i.e. the "All's Well?" symbol. The following scenarios are possible:

(4.2.a) If a problem is encountered, e.g., the visitor's digital fingerprint does not match the original fingerprint that was originally scanned in at the consulate, then a pertinent anomaly message is returned to the Visitor-Visa Kiosk 1 and/or to the immigration official's workstation screen. The official then takes the appropriate action. The visitor's Central Database 2 record is tagged as problematic, with the appropriate code, as well as any other pertinent data.

(4.2.b) On the other hand, it is possible that authorities have tagged the visitor's Central Database 2 record as "need to apprehend". In this case, a message is communicated to the nearest law enforcement authorities to proceed immediately to the location of visitor's Kiosk 1 location, as well as to the immigration official's workstation screen. Once again, the visitor's Central Database 2 record is tagged as problematic, with the appropriate code, as well as any other pertinent data.

(4.2.c) For most visitors, no problems would be encountered. The Visitor-Visa Kiosk 1 would then calculate when the visitor next needs to check in, provided he does not leave the country prior to the calculated date. As mentioned previously above, this information is displayed to the visitor on the display unit 8, and if a printer 11 is available, a note 12 is printed for the visitor in his preferred language (see Table 1, item [10]). The visitor then proceeds to customs prior to entering the country.

Other possible "All's Well?" scenarios could exist, and even though they are not described here, they are not excluded from the present invention.

Once the visitor has been cleared by the customs and immigration officials, he enters the country with his Visitor-Visa Card 400 in-hand. An explanation is given to the visitor, e.g. via a pamphlet, preferably in the language that the visitor understands, regarding the use and relevance of the card 400.

Before proceeding with the preferred embodiment of the invention, a note is made of one alternate implementation of the invention. This implementation addresses the situation in which long waiting lines of visitors are present to pass through the customs and immigration process at a Port-of-Entry. A mobile Kiosk 1 (not depicted in any diagram) is used to gather initial data from each visitor whilst waiting in line. This mobile Kiosk 1 would be mounted on, for example, a wheeled cart, which an immigration official handles. Another implementation of the mobile Kiosk 1 could be a hand-held device. The [mobile] immigration official approaches various visitors waiting in line and has them enter their Visitor-Visa card 400, collects visitor biometrics, etc. In other words, this step is similar to the visitor verification process described above in this section. The collected visitor's data is transmitted securely, for example wirelessly (e.g. using existing technologies such as WiFi®, Bluetooth™, WiMax/802.16, WCDMA, UMTS, SDR, 802.11, 802.11a, 802.11b, 802.11d, etc.), to a computer server for further processing and verification. When the pre-processed visitor reaches an immigration official's workstation, the visitor scans her card 400 in order to pull up her pre-processed record which was collected via the mobile Kiosk 1 and processed/stored in the computer server. The normal visitor verification would then continue, i.e. current visitor biometrics have already been entered and verified in the pre-processing stage. This process could be used as well at land border crossings, i.e. at land-ports, but rather officials would approach motor vehicles and their occupants waiting in line.

4.3) Losing a Visitor-Visa Card

If the card 400 is lost, then the visitor must immediately report its loss and go to the nearest immigration office to generate a new card 400. In this process, the visitor would have to pay for a new card 400. At the time that the loss is reported, the Central Database 2 would be updated that the card 400 is no longer valid, i.e. the Visitor-Visa Card Number 403 is invalid and the visitor is scheduled to obtain a new card 400.

The visitor would be photographed and fingerprinted again, as he originally was at the consulate (block 19 in FIG. 2). The visitor's new digital photo and fingerprint images are first compared with those stored in the Central Database 2, that were inputted during the process of "Initialization At Consulate" (block 19 in FIG. 2). If the images match, then a new card 400 is generated for the visitor and his Central Database 2 record is updated. Note that the originally issued card's identification data remains in the Central Database 2, but is tagged as "lost". The reason for this is in the advent that the stolen card is fraudulently used, it can be detected and the miscreant apprehended. If the card 400 is returned, the database 2 is updated, but a record is still kept of the card 400 theft in case fraudulent use is made of the data on the card 400. Sometimes it may be feasible to simply retire the stolen card 400 from circulation, even if it is returned to authorities.

4.4) Time To Check-in—Block 21 in FIG. 2

At some predetermined time interval, e.g. every three months or six months, etc. from the date of arrival in the country, the visitor must check-in at a local immigration office, or at a place, that has a Visitor-Visa Kiosk 1 available. The visitor can use the phone contact information 405 that is printed on the front face of the card 400 to locate where the nearest Kiosk 1 is located.

Although not illustrated, the preferred embodiment of the invention uses a common telecommunications technique, which is based on a telephone 's caller-id. The number that the visitor dials, per the contact phone number 405, is implemented using an Interactive Voice Response (IVR) computer system. Firstly, the visitor is prompted to enter his card identification number 403 using the keypad on the phone. These instructions are printed on the pamphlet that was given to the visitor at her Port-of-Entry (see section [4.2] above). The number 403 is used to access the Central Database 2 to find out what is the visitor's preferred language, or languages. This language is then used to issue all further instructions, etc.

The IVR computer recognizes from where the call is placed, and if the appropriate menu option is selected (e.g. "Where is the nearest Kiosk location?"), the system tells the visitor where the nearest Visitor-Visa Kiosk 1 is located.

The preferred embodiment provides this information via the Internet as well (e.g. on a web site, which is not illustrated). This step in the process is illustrated by the "Locate Visitor-Visa Kiosk in City", block 22 in FIG. 2.

Note that it is preferable for the Kiosk 1 to be in a secure location to prevent vandalism and other abuses of the system. Examples of such locations are as follows (see Table 2):

TABLE 2

Locations of In-Country Visitor-Visa Kiosks

1) Local government offices, e.g. immigration office, post offices, etc.
2) Select local police stations that are located in public areas.
3) College campus Registrar's office or campus police stations.
4) Airport locations, e.g. monitored by the U.S. Transportation Security Administration.
5) Train stations, e.g. monitored by railway staff.

The visitor then goes to the nearest Visitor-Visa Kiosk 1 and takes his Visitor-Visa card 400 along with him. Note that at this stage the visitor does not need his passport and hence can leave it stored securely at his hotel, etc.

4.5) Check-in With Visitor-Visa Kiosk—Block 23 in FIG. 2

Before continuing with the detailed description of this step in the process, a note needs to be made regarding the various data storage implementation methods of the Visitor-Visa card 400, as mentioned above in the section titled "4.1) Initialization At Consulate". In this section, it was mentioned that identification information about the visitor (i.e. Table 1) is stored in a number of technologies, i.e. a smart-chip 401 and/or a magnetic stripe 406, or a laser-card. Because of the previously mentioned physical data storage limitations of the magnetic stripe 406, the preferred embodiment of the invention implements data storage on the card 400 in a smart-chip 401.

On the other hand, if a smart-chip 401 implementation is not used, then this information would be retrieved from the Central Database 2. This is done by retrieving the visitor's record in the Central Database 2, using the secure network 10 and the card identification number 403. This record contains the original copy of all of the pertinent identification information about the visitor that is listed in Table 1.

After locating the nearest Visitor-Visa Kiosk 1, the foreign visitor approaches the Kiosk 1 with his Visitor-Visa Card 400 in-hand.

Note that the Visitor-Visa Kiosk 1 could be monitored by video cameras to deter vandalism, etc.—as bank ATMs are monitored today 4.5.1) Visitor-Visa Card Verification The Kiosk 1 has markings (not illustrated in FIG. 1A nor FIG. 1B) as to where the person needs to stand, or be seated depending on the ergonomics of the Kiosk 1, in order to appear correctly within the focal length of the Visitor-Visa Kiosk's digital camera 3.

The person enters her card 400 into the Kiosk's card scanner 7.

The data retrieved from the visitor's card 400 is temporarily stored in the Kiosk's memory 4 for processing purposes, as well as along with the date and time of the transaction, as well as the geographic location of the Visitor-Visa Kiosk 1. Note that the geographic location of the Visitor-Visa Kiosk 1 could simply be implemented as a device id, which the Central Database 2 then translates into the known geographic location.

The Kiosk's CPU 6 next verifies that the visitor's card 400 has a valid digital signature (see Table 1, item [13]). If the digital signature is invalid, then the CPU 6 notes this information as part of the temporarily stored data record of the visitor in memory 4. The reason for this is that further validation of the person's identity is required, i.e. via biometrics such as a digital fingerprint scan and a digital photo.

Note that at no time does the invention forewarn the visitor of any problems. The reason for this is not to alarm the visitor before more data is gathered, etc.

The Kiosk 1 retrieves the language (See Table 1, item [10]) in which the visitor prefers to communicate. The CPU 6 retrieves the relevant language menus that are pre-stored in the Kiosk's memory 4. The reason for this is obvious, i.e. to minimize any potential communications problems with the visitor regarding any conveyed instructions, etc. Note that it is possible for the invention to simply store in memory 4, say the English menu system, and then to programmatically translate to the visitor's preferred language. The preferred embodiment of the invention uses the simpler method of pre-storing menus in all of the accepted foreign languages. This reduces the need and expense for today's relatively sophisticated language translation software to be embedded in the Kiosk 1.

The first message to appear on the Kiosk's display 8 is for the visitor to remove any headgear, sunglasses, etc. that could interfere with the facial identification of the person. Next, the person is informed that a photo will be taken. Preferably, a countdown indicator is displayed on the display 8 informing the visitor of the imminent photo taking.

After the digital photo has been taken, the visitor is prompted via the Kiosk's display 8 to place his pertinent finger on the surface of the digital fingerprint scanner 5. His fingerprint is digitally scanned in and temporarily stored in memory 4. If other forms of biometric data are used, then it would be gathered by the Kiosk 1 at this stage.

For the casual visitor to the country, this would suffice for the check-in process. On the other hand, if the visitor is say a student, then other information could be asked to be verified by the visitor, for example, the visitor's current residential address, place of study, etc. (i.e. in "Other Data", Table 1). If any information has changed, a touch-screen keyboard is displayed on the display 8 using the visitor's preferred language, and the visitor is prompted to enter the correct information. Other examples of longer-term foreign visitors are temporary workers, visiting academics, political refugees, etc.

Once the visitor has submitted all of his required information, the visitor's temporary data record stored in the Kiosk's memory 4, is sent to the Central Database 2, via a secure network 10. In FIG. 2, this step in the process is identified as "Log Visit in Central Database", block 101.

A program at the Central Database 2 then processes the received information by comparing all the pertinent data (see Table 1) with a copy of the visitor's identification data (i.e. in Table 1), which was originally stored in the Central Database 2 at the time that the visitor's card 400 was created and issued.

The next step in the check-in process is depicted in block 25 in FIG. 2, i.e. the "All's Well?" symbol. The following scenarios are possible:

(4.5.1.a) If a problem is encountered, e.g., the visitor's digital fingerprint does not match the original fingerprint that was scanned in at the consulate, then a pertinent anomaly message is returned to the Visitor-Visa Kiosk 1. The Kiosk 1 then informs the visitor via the display unit 8 that he needs to visit, in person, the nearest Customs and Immigration office within a specified time-period. This step is depicted by the "Visit Visitor-Visa Office", block 80 in FIG. 2. The Visitor-Visa office location is displayed to the visitor on the display 8, and the Kiosk's integrated printer 11 prints the location and the specified time-period out for the visitor on a piece of paper 12. The visitor's Central Database 2 record is tagged as problematic, with the appropriate code, as well as any other pertinent data.

(4.5.1.b) On the other hand, it is possible that authorities have tagged the visitor's Central Database 2 record as "need to apprehend". In this case, a message is communicated to the nearest law enforcement authorities to proceed immediately to the location of visitor's Kiosk 1 location. Another message code is transmitted to the Visitor-Visa Kiosk 1 to stall the person. The stall process could entail asking many other seemingly related questions, as well as displaying other information. Once again, the visitor's Central Database 2 record is tagged as problematic, with the appropriate code, as well as any other pertinent data.

(4.5.1.c) For most visitors, no problems would be encountered. The Visitor-Visa Kiosk 1 would then calculate when the visitor next needs to check in, provided he does not leave the country prior to the calculated date. As mentioned previously above, this information is displayed to the visitor on the display unit 8, and if a printer 11 is available, a note 12 is printed for the visitor in his preferred language (see Table 1, item [10]).

Other possible "All's Well?" scenarios could exist, and even though they are not described here, they are not excluded from the present invention.

4.6) Data Mining of the Central Database

The information stored in the Central Database 2, including the check-in events of the foreign visitor, can be searched (i.e. mined) by various authorized computer programs. We now consider a number of these processes:

4.6.1) Check for Unusual Behavior—Block 201 in FIG. 2:

A computer program 201 runs constantly checking for unusual behavior 200 patterns in the data collected in the Central Database 2. Unusual behavior would simply imply searching for anomalies such as fraudulent use of a particular Visitor-Visa Card 400, or a visitor's overstay.

In the fraud case, it could be that a person simply copied all the information from one card 400 to another card. This behavior could be detected on a number of levels:

a. The same Visitor-Visa Card Number 403 is present in the data storage memory of both Visitor-Visa cards.

b. The encrypted digital biometric images (e.g. fingerprint and/or photo) that are stored in the Central Database 2 are not the same as that captured at check-in time by the Kiosk's digital camera 3, or digital fingerprint scanner 5.

Common fraudulent document detection methods would apply to this program 201, but are not explicitly discussed here.

Other uses 300 (see FIG. 2) of the Central Database 2 by authorized parties include:

(4.6.2) Traffic Stop

If the visitor were pulled over by police 301 (see FIG. 2), say for speeding, then the police officer would scan 399 the visitor's Visitor-Visa card 400 on equipment supplied to the police authorities (not shown in FIG. 2). The visitor's information would then be logged and checked 102 in the Central Database 2. If any anomaly is discovered, or the visitor's Central Database 2 record has been tagged, the police officer can take the appropriate action.

(4.6.3) Financial Transaction Validation

The Visitor-Visa card 400 check-in process could be modified and used in other circumstances during the visitor's visit. For example, the card 400 can be scanned whenever the visitor checks into a hotel, or rents a car, or travels by rail, etc. (see block 302 in FIG. 2). Currently, a valid ID document is required in these situations, hence the requirement to use the Visitor-Visa card 400 would not be exceptional.

Supplying this information could help in various ways, including for routine crime reduction. An example of routine crime reduction could be in the advent that a visitor's wallet was stolen in which his credit cards and identification documents were located. The visitor would report the theft to the relevant authorities, including the Visitor-Visa card 400 authorities (see above section (4.3) titled "Losing a Visitor-Visa Card"). The thief would then have to use the Visitor-Visa card 400 whenever he'd use, e.g. a credit card within the country. This process would need the possible process modification by the credit card companies. For example, if a credit card is used, and the credit card number belongs to an overseas visitor (i.e. it was issued by an overseas bank), then the visitor's Visitor-Visa card 400 would have to be scanned as well, rather than simply having to display the card 400 as identification.

4.7) Check Out at Port-of-Exit—Block 110 in FIG. 2

When the visitor is ready to leave the country, he needs to check-in one last time with a Visitor-Visa Kiosk 1. This time, the Kiosk 1 is located within the exit process implemented by the country's customs and immigration authorities, i.e. at the Port-of-Exit (i.e. at airports, seaports and land-ports).

The check out process is similar to that outlined in the above section (4.5) titled "Check-in With Visitor-Visa Kiosk" (Block 23 in FIG. 2), with the following exception: the visitor's card 400 is "swallowed" by the Visitor-Visa Kiosk 1, i.e. it is not returned to the visitor.

This card 400 "swallow" process does not apply to certain visa types, i.e. types that are authorized for long-term stay in the country and have not overstayed permitted time in the country. In the US, examples of these visa types include:

A visa—Diplomatic and other government officials, and their families and employees.

G visa—Representatives to international organizations and their families and employees.

J visas—Exchange Visitors and their families.

H-1B visas—Persons in a specialty occupation, which requires the theoretical and practical application of a body of highly specialized knowledge requiring completion of a specific course of higher education.

L visas—Intra-company transferees who, within the three preceding years, have been employed abroad continuously for one year, and who will be employed by a branch, parent, affiliate, or subsidiary of that same employer in the U.S. in a managerial, executive, or specialized knowledge capacity.

I-551—US permanent residents, i.e. "green card" holders.

Numerous other immigrant and non-immigrant visa classifications apply as well, but are not listed here.

The visitor's Central Database 2 record is updated accordingly.

At check out, the visitor's Central Database 2 record is checked for any anomalies before the visitor is allowed to exit the country.

Once the card 400 has been returned to the authorities at check out, the visitor related data on the card 400 is erased and it is now available to be reused with a new visitor entering the country. On the other hand, it is as feasible to simply safely discard the card 400.

In the case where the card 400 is not "swallowed", on re-entry to the country, the cardholder goes through a similar process as to the one detailed in the section titled "Check-in With Visitor-Visa Kiosk" (Block 23 in FIG. 2). The difference in this case is that the check-in process is via the immigration authority at a Port of Entry. The same validation tasks, as described in section (4.2) titled "Verification at Port-of-Entry" are undertaken to ensure that the cardholder is correctly listed in the database 2.

What is claimed:

1. A distributed immigration and non-immigration visa issuing and validation system for a visitor's visa application to visit, study or work in a visited country, comprising:

a) a computer encoded card;

b) a plurality of first computers comprising:

i) a means for capturing a plurality of first biometric data from said visitor, said plurality of biometric data including a facial photograph of said visitor, ii) a means for entering first textual data, iii) a means for storing said first biometric data and said first textual data on said computer encoded card;

iv) a means to communicate in a multiplicity of foreign languages on said first computers, wherein said visitor selects a language to communicate with said first computers from said multiplicity of languages;

v) a means to translate said first textual data from said multiplicity of foreign languages to a language used by said visited country, said translation of said first textual data are second textual data;

c) a first computer server remotely located from said first computers comprising:
   i) a first database system,
   ii) a plurality of programs for interacting with said first database system;
d) a first communications network interconnecting said first computers to said first computer server;
e) wherein said computer encoded card includes a first unique identifier;
f) wherein said first computers store said first biometric data, said first textual data and said second textual data in said first database system located on said first computer server system using said first communications network;
g) wherein said first textual data and said second textual data includes information about said visitor's stay in said visited country and additional data.

2. The system of claim 1 wherein said first biometric data selected from the group consisting of a fingerprint, a photograph and a retina scan.

3. The system of claim 1 wherein said computer encoded card comprising:
   a) a memory, said memory storing said first biometric data, said first textual data and said second textual data;
   b) said first unique identifier visible on face of said computer encoded card;
   c) said facial photograph printed on face of said computer encoded card;
   d) a magnetic stripe, wherein said magnetic stripe storing third textual data, said third textual data uniquely identifying said computer encoded card and said visitor;
   e) other descriptive and contact information visible on face of said computer encoded card.

4. The system of claim 1 wherein said first communications network comprising a secure network, wherein said secure network selected from the group consisting of X.25, dedicated telecommunication lines, satellite VSAT network and a virtual private network over the Internet.

5. The system of claim 1 wherein said first biometric data, said first textual data and said second textual data stored in said first database system is accessed using said first unique identifier.

6. The system of claim 1 wherein said first computer selected from the group consisting of a computer terminal, a personal computer and a self-service computer kiosk.

7. The system of claim 1 wherein said first database system residing in said visited country.

8. The system of claim 1 wherein said computer encoded card selected from the group consisting of a smartcard and a laser card.

9. The system of claim 1 wherein said means for entering said first textual data comprises a keyboard displayed on said first computer screen in one of said multiplicity of foreign languages, selected by said visitor, said first computer screen comprising a touch-screen input means.

10. A distributed immigration and non-immigration visa issuing and validation system for a visitor's visa application to visit, study or work in a visited country, comprising the steps of:
   a) collecting first biometric data and additional first data from said visitor with a first computer by a visa issuing authority in a foreign country;
   b) said first data collected in a first language selected by said visitor from a multiplicity of foreign languages used to communicate with said first computer, and said first data translated into a common language used by said visited country from said first language by said first computer, said translated language data are translated second textual data;
   c) transferring said first biometric data, said additional first data and said translated second textual data from said first computer to a second computer using a first communications network, said second computer comprising a first database system, said first database system residing in said visited country;
   d) storing said first biometric data, said additional first data and said translated second textual data in said first database system;
   e) validating said first biometric data using a multiplicity of watch-list databases;
   f) validating said other first data and said translated second textual data;
   g) issuing a computer encoded card to said visitor, provided said validating steps are approved by said visa issuing authority, said computer encoded card comprising a first unique identifier, said first biometric data, said other first data and said translated second textual data;
   h) using said computer encoded card to board transport carriers to said visited country;
   i) using said computer encoded card to enter said visited country in conjunction with a valid passport;
   j) validating said visitor by collecting second biometric data using a third computer, said validating comprising transferring said second biometric data to said first database system and comparing said second biometric data with said first biometric data stored in said first database system and said first biometric data stored in said computer encoded card;
   k) instructing said visitor to check-in with a first self-service computer terminal by a predetermined date, said first self service computer terminal located in a plurality of locations in said visited country;
   l) connecting said self-service computer terminal to said first database using a second communications network;
   m) using said computer encoded card to check-in with said first self-service computer terminal;
   n) accessing said first database system by said self-service computer terminal, using said first unique identifier, said first unique identifier read from said computer encoded card;
   o) validating said visitor by collecting third biometric data using said first self-service computer terminal, said validating comprising transferring said third biometric data to said first database system and comparing said third biometric data with said first biometric data stored in said first database system and said first biometric data stored in said computer encoded card;
   p) using said computer encoded card in said visited country as a personal identity means.

11. The system of claim 10 wherein said watch-list databases comprise undesirable persons selected from the group consisting of said visited country law enforcement databases, an originating country law enforcement databases, an Interpol database, a multiplicity of intelligence services databases and said visa issuing authority databases.

12. The system of claim 10 wherein said second communications network comprising a secure network, wherein said secure network selected from the group consisting of X.25, dedicated telecommunication lines, satellite VSAT network and a virtual private network over the Internet.

13. The system of claim 10 wherein said means for collecting said first textual data comprises a keyboard displayed on said first self-service computer terminal screen in one of said multiplicity of foreign languages, selected by said visitor, said first self-service terminal computer screen comprising a touch-screen input means.

14. A distributed immigration and non-immigration visa issuing and validation system for a visitor's visa application to visit, study or work in a visited country, comprising the steps of:
- a) collecting first biometric data and additional first data from said visitor with a first computer by a visa issuing authority in a foreign country;
- b) said first data collected in a language selected by said visitor from a multiplicity of foreign languages used to communicate with said first computer and translated into a common language used by said visited country by said first computer, said translated language data are translated second data;
- c) transferring said first biometric data, additional first data and said translated second data from said first computer to a second computer using a first communications network, said second computer comprising a first database system, said first database system residing in said visited country;
- d) storing said first biometric data, said additional first data and said translated second data in said first database system;
- e) validating said first biometric data using a multiplicity of watch-list databases;
- f) validating said other first data and said translated second data;
- g) issuing a computer encoded card to said visitor, provided said validating steps are approved by said visa issuing authority, said computer encoded card comprising a first unique identifier, said first biometric data, said other first data and said translated second data;
- h) using said computer encoded card to enter said visited country;
- i) validating said visitor by collecting second biometric data using a fourth computer, said fourth computer comprising a mobile computer operated by a visited country immigration official whilst said visitor is waiting in an immigration entry queue;
- j) reading said first biometric data, said other first data and said translated second data from said computer encoded card by said fourth computer, k) said validating comprising transferring said second biometric data, said additional first data and said translated second data to said first database system and comparing said second biometric data with said first biometric data, said other first data and said translated second data stored in said first database system and said first biometric data, said additional first data stored and said translated second data in said computer encoded card;
- l) using said computer encoded card in said visited country as a personal identity means.

15. The system of claim 14 wherein said mobile computer is connected to said first database system using a secure wireless network, wherein said wireless network selected from the group consisting of Bluetooth, IEEE 802.16, IEEE 802.11, IEEE 802.11a, IEEE 802.11b, IEEE 802.11d and WCDMA.

16. The system of claim 14 wherein said first communications network comprising a secure network, wherein said secure network selected from the group consisting of X.25, dedicated teleconmiunication lines, satellite VSAT network and a virtual private network over the Internet.

17. The system of claim 14 wherein said first biometric data, said first textual data and said translated second data stored in said first database system is accessed using said first unique identifier.

18. The system of claim 14 wherein said first computer selected from the group consisting of a computer terminal, a personal computer and a self-service computer kiosk.

19. The system of claim 14 wherein said first database system residing in said visited country.

20. The system of claim 14 wherein said computer encoded card selected from the group consisting of a smart-card and a laser card.

* * * * *